Figure 1:
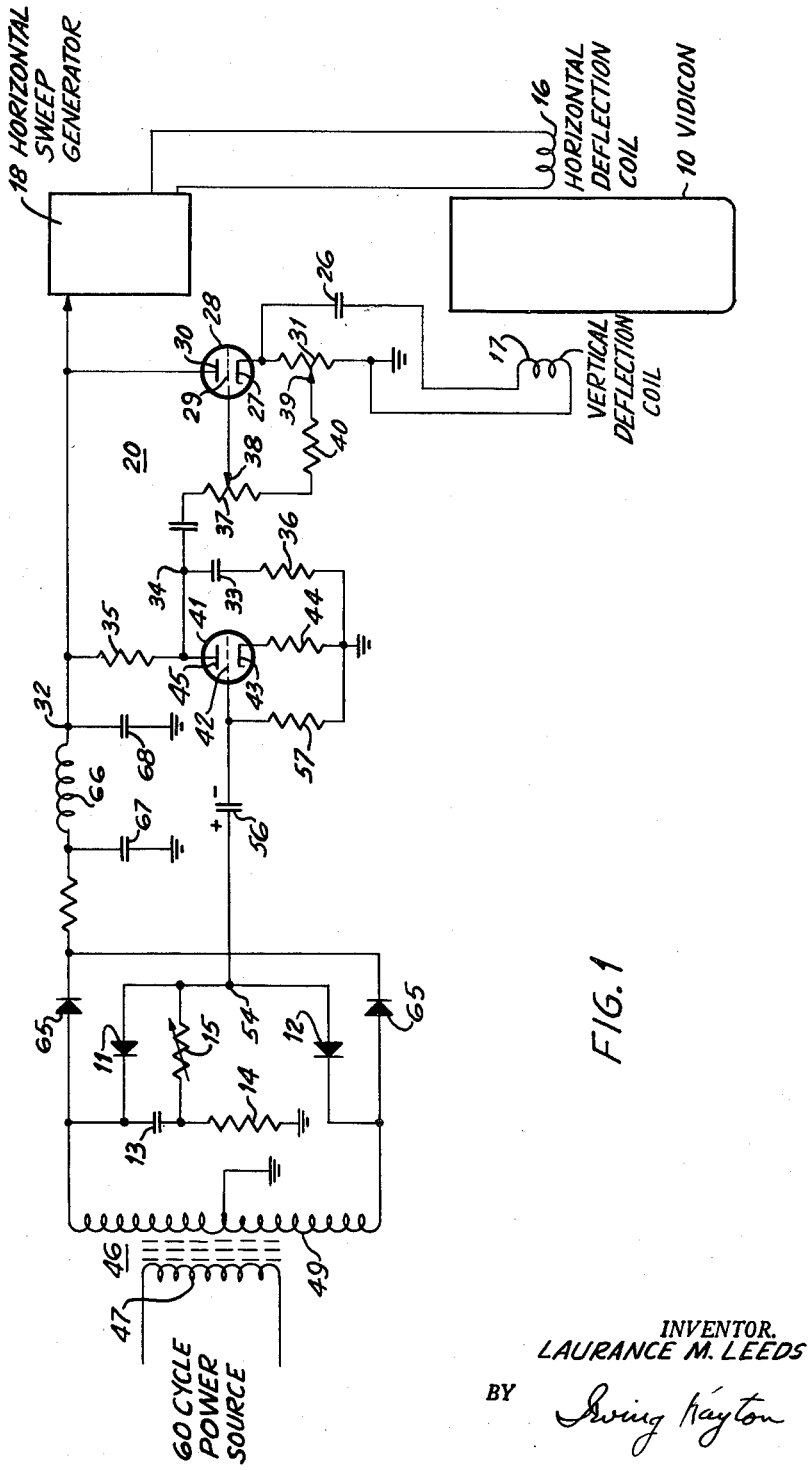

United States Patent Office 3,123,775
Patented Mar. 3, 1964

3,123,775
TELEVISION CAMERA VERTICAL SWEEP CIRCUIT
Laurance M. Leeds, Syracuse, N.Y., assignor to General Electric Company, a corporation of New York
Filed July 22, 1960, Ser. No. 44,676
1 Claim. (Cl. 328—32)

This invention relates to a line voltage derived sweep driving circuit and more particularly to a circuit for driving the vertical sweep or scan in a television camera or the like in which the drive is obtained directly from a voltage derived from the alternating current supply line.

To control the vertical sweep in television cameras, a 60 cycle wave of saw tooth configuration is usually desired and it is also desired that this 60 cycle saw tooth wave be synchronized with the 60 cycle supply line voltage or current to obviate various undesirable effects. It has often been the practice to generate the 60 cycle saw tooth wave from an oscillator and to then synchronize this saw tooth wave with a voltage obtained from the supply line by controlling the oscillator.

Another frequently used means to generate the requisite saw tooth is by circuitry adapted to generate a saw tooth wave directly from a voltage derived from the supply line to thus eliminate the necessity for synchronizing circuits. The present invention is embodied in an improved and simplified circuit of this latter type.

To obtain the saw tooth wave, a capacitor may be gradually charged up through suitable resistance means and then discharged periodically and abruptly under the control of a signal derived from the supply line voltage. The voltage developed across the capacitor may be applied to the deflection circuit of a television camera tube, for example, preferably by applying the voltage across the capacitor to the grid circuit of a space discharge device having the vertical deflection coil of a television camera tube in the cathode circuit thereof. The deflection coil may preferably be in the cathode circuit in a manner such as to provide cathode follower action to increase the linearity of the deflection with respect to time.

The capacitor of the saw tooth wave generator may preferably be discharged periodically by means of a space discharge device having an anode and a cathode between which the capacitor is connected, the device being normally nonconductive but being rendered conductive periodically through positive pulses applied to the grid thereof, to discharge the capacitor.

The pulses for application to the saw tooth wave generator are developed from a signal derived from the supply line. The supply line signal will under ideal conditions have a true sine wave form and although the wave form of the supply line signal may vary appreciably from a true sine wave, it will normally be of a sine wave form in the sense that there is a continuous comparatively smooth change in amplitude of the signal with no abrupt changes in the rate of change of the amplitude of the signal.

A major feature in the circuit of the invention is the means for converting the line voltage sine wave into a 60 pulse per second train for exciting or triggering the saw tooth wave generator. A portion of the line voltage is passed through a full-wave rectifier. Another portion of the line voltage is passed through a phase shifter which shifts the line voltage sine wave by approximately 90 degrees. The outputs of the full-wave rectifier and the phase shifter are combined whereby the resultant is a 60 pulses per second train. These positive pulses are characterized by their sharpness and, therefore, their excellent adaptability for triggering the saw tooth generator.

These pulses are applied to the saw tooth generator through a coupling circuit which functions to supply grid bias for the space discharge device used to discharge the capacitor in the saw tooth generator. This coupling circuit may comprise a resistor and capacitor connected to the grid of the discharge device. When the positive pulses formed by the resultant output of the full-wave rectifier and phase shifter are applied, the grid of the discharge device is driven positive with respect to the cathode so that current may flow and this current may charge up the capacitor of the coupling circuit with a polarity such that the grid is maintained at a negative potential beyond cut-off in the time periods between pulses. This may function to increase the effective sharpness of the pulses since the capacitor may be charged up in the initial portion of each pulse and the potential of the grid may be sharply decreased after the pulse reaches its maximum value. This bias arrangement is, of course, self regulating. The time constant of the coupling circuit should be substantially greater than the duration of one cycle of the supply line signal.

The novel feature which I believe to be characteristic of my invention are set forth with particularity in the appended claim. My invention itself, however, both as to its organization and method of operation, together with further objects and advantages thereof, may best be understood by reference to the following description taken in connection with the accompanying drawings.

Figure 2:
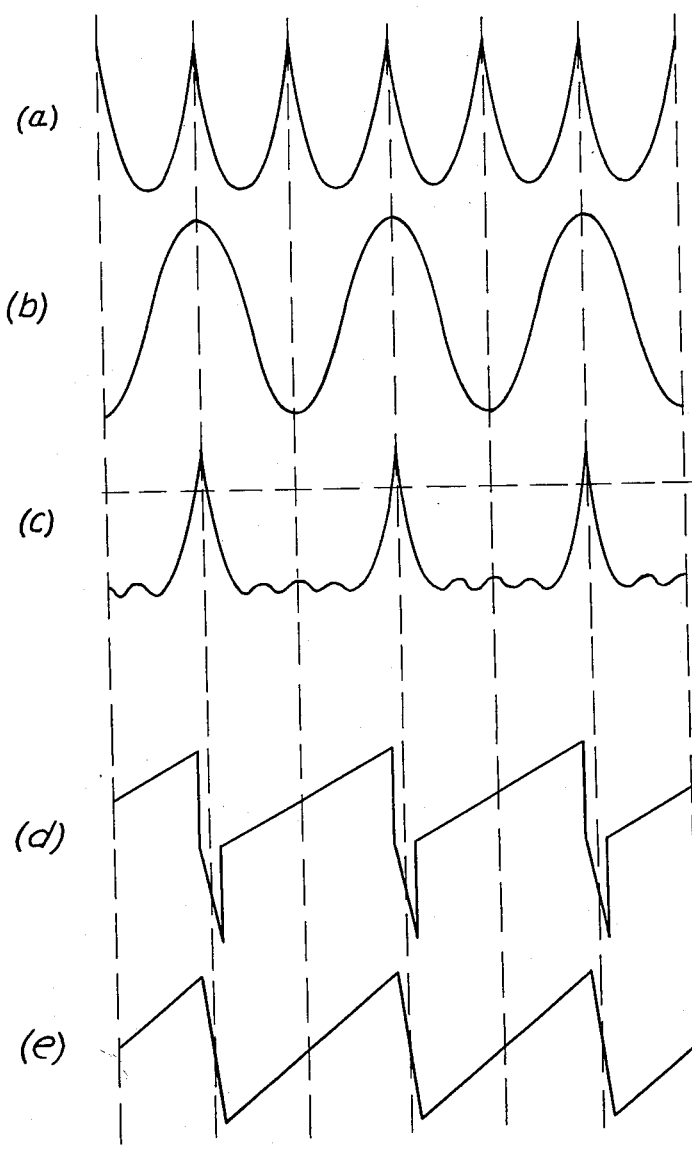

In the drawings:
FIGURE 1 is a circuit diagram of a portion of a television camera incorporating the sweep driving circuit of this inveniton; and
FIGURE 2 is a graph illustrating the wave forms at certain points in the circuit in FIGURE 1.

Reference numeral 10 designates a television camera pickup tube which may be of the type referred to in the art as a vidicon tube. The tube 10 may comprise the following elements (none of which are shown): an electron-emitting cathode, a control grid, an accelerating grid and a focusing grid for forming and focusing a beam of electrons at a target on which a light image to be transmitted may be focused.

The cathode ray or electron beam may be caused to scan the target by means of horizontal and vertical deflection coils 16 and 17. The horizontal deflection coils 16 may be connected to a horizontal sweep generator 18 illustrated in block form in drawing and the vertical deflection coils 17 may be connected to a vertical sweep generator generally designated by reference numeral 20 which will be described in detail hereinafter.

The vertical sweep generator 20 may act to generate the vertical sweep driving signal, which may have a saw tooth wave form, directly from a signal derived from the supply line. In particular, the vertical deflection coil 17 may be connected through a coupling capacitor 26 to the cathode 27 of a discharge device 28 also having a grid 29 and a plate or anode 30. The cathode 27 may be connected through a resistor 31 to ground and the anode 30 may be connected to a circuit point 32 at a relatively high positive potential relative to ground. A signal having a generally saw tooth wave form may be applied to the control grid 29 to generate a saw tooth wave of current in the vertical deflection coils 17 and obtain proper deflection of the cathode ray beam.

For this purpose, a capacitor 33 may have one terminal connected to a circuit point 34 which is connected through a resistor 35 to the circuit point 32 with the other terminal of the capacitor connected to ground, preferably through resistor 36. The capacitor 33 is gradually charged up through the resistor 36 and resistor 35 but is periodically and abruptly discharged to develop a voltage of saw tooth wave form at the circuit point 34. This circuit point 34 is coupled through a capacitor to one end of a potentiometer 37 having a movable contact 38 connected to the grid 29 with the other end of the potentiometer 37 being connected to a movable contact 39 of a potentiometer 31 through series resistor 40. By adjustment of the movable contact 39, the bias of the device 28 may be adjusted and by adjusting the position of the movable contact 38, the magnitude of the saw tooth wave applied to the grid 29 may be adjusted so as to obtain proper deflection of the cathode ray beam.

The capacitor 33 may be periodically and abruptly discharged through means controlled directly from the supply line voltage which may preferably comprise a discharge device 41 having a control grid 42, a cathode 43 connected through a resistor 44 to ground and a plate or anode 45 connected to the circuit point 34. The device 41 may be normally biased beyond cut-off so as to be non-conductive but may be periodically rendered conductive so as to discharge the capacitor 33.

For this purpose, a power transformer 46 may be provided having a primary winding 47 connected to a conventional outlet to energize the primary 47. The energy may be in the form of 60 cycle alternating current, as is standard in this country. The transformer 46 also has a secondary winding 49. The mid-point of secondary winding 49 is grounded. The two end terminals are connected to diodes 11 and 12 which are in series with like electrodes connected at circuit point 54. The center-tapped secondary 49 and the diodes 11 and 12 operate to provide full-wave rectification of the 60 cycle sine wave. The wave form at point 54 due to the full-wave rectifier alone is as shown in FIGURE 2, curve (a).

A phase shifter comprising capacitor 13 in series with resistor 14 is connected from a point intermediate diode 11 and a terminal of secondary 49 to ground. A portion of the sine wave from the secondary winding 49 is therefore coupled to the phase shifter whereby the sine wave is shifted approximately 90 degrees at the junction of resistor 14 and capacitor 13. The phase shifted 60 cycle sine wave is as shown in FIGURE 2, curve (b). The output of the full-wave rectifier (FIGURE 2, curve a) and the output of the 90 degree phase shifter (curve b) are added in proper proportion by variable resistor 15. The composite wave which results and is applied to trigger the saw tooth wave generator is the 60 cycle pulse train as represented by curve (c), FIGURE 2. Curve (c), it may be seen, is derived by algebraically combining curves (a) and (b).

A coupling circuit is provided including a capacitor 56 between the circuit point 54 and the grid 42 of the device 41 and a resistor 57 between the grid 42 and ground. The resultant output across the resistor 57 may have positive peaks effective to cause conduction of the device 41 to discharge the capacitor 33. When such positive peaks are applied to the grid 42, it may become positive with respect to the cathode 43 so as to charge up the capacitor 56 with a polarity as indicated in the drawing so as to provide a negative grid bias for the device 41. Such bias will hold the device 41 in a non-conductive state until the occurrence of the next positive peak of signal. This bias is self-regulating. The cut-off bias for the device 41 may be at a level as designated in curve (c) of FIGURE 2 by the horizontal broken line. The very sharp positive peaks of curve (c) cause the capacitor 33 to be discharged very rapidly, and the wave form at the circuit point 34 is as designated by curve (d) in FIGURE 2. The irregular form of curve (d) is caused by the provision of the resistor 36 between the capacitor 33 and ground, this wave form being preferable for generating a saw tooth wave of current in the inductive deflection coil 17. The saw tooth wave current in the vertical deflection coil is as shown in curve (e) of FIGURE 2.

The secondary 49 not only develops a signal for controlling generation of the vertical sweep driving signal, but may also supply power for energization of the horizontal sweep circuit and other circuits of the television camera. For this purpose, the terminals of the secondary winding 49 may be connected through a rectifier 65 and through a filtering choke 66 to the circuit point 32. The opposite ends of the filtering choke 66 may be connected to capacitors 67 and 68 to ground, the choke 66 cooperating with the capacitor 67 and 68 to provide a filtered D.C. voltage at the circuit point 32. This voltage may be applied to the horizontal sweep generator 18 in addition to its connection to the vertical sweep generator 20.

While I have shown a particular embodiment of my invention, it will be understood that many modifications may be made without departing from the spirit thereof, and I contemplate by the appended claim to cover any such modifications as fall within the true spirit and scope of my invention.

What I claim is:

A vertical deflection sweep signal generator comprising a saw tooth voltage generator including a capacitor for gradually building up and rapidly discharging electrical charge for generating said saw tooth voltage, and a space discharge device coupled to said capacitor for inducing said rapid discharge said space discharge device having a control electrode; means for generating a periodic train of sharp positively polarized pulses to be applied to said control electrode comprising a 60 cycle sine voltage source coupled to the primary of a power transformer, said transformer having a center-tapped and grounded secondary winding, a diode connected to each of the two end terminals of said secondary winding with like electrodes of said diodes connected to provide full wave rectification of said 60 cycle voltage, a series resistor and capacitor connected between one end terminal and the grounded center terminal of said secondary winding to shift the phase of said 60 cycle voltage by approximately 90 degrees, a resistor coupled from a junction point of said connected diodes and the junction of said series capacitor and resistor to combine said full-wave rectified voltage and said phase shifted voltage; and a coupling capacitor connected between said junction point of said diodes and said control electrode of said space discharge device for applying said combined voltage to said electrode.

References Cited in the file of this patent

UNITED STATES PATENTS

| | | |
|---|---|---|
| 2,391,082 | Beste | Dec. 18, 1945 |
| 2,440,465 | Gerguson | Apr. 27, 1948 |
| 2,748,283 | Merrill et al. | May 29, 1956 |
| 2,972,064 | Hurlbut | Feb. 14, 1961 |
| 2,978,642 | Papineau | Apr. 4, 1961 |